US008589171B2

(12) United States Patent
Savenok et al.

(10) Patent No.: US 8,589,171 B2
(45) Date of Patent: Nov. 19, 2013

(54) SYSTEM AND METHOD FOR CUSTOM MARKING A MEDIA FILE FOR FILE MATCHING

(75) Inventors: Alexander Savenok, Grandview, MO (US); Pavel Savenok, Whaeton, IL (US)

(73) Assignee: Remote Media, LLC, Wheaton, IL (US)

( * ) Notice: Subject to any disclaimer, the term of this patent is extended or adjusted under 35 U.S.C. 154(b) by 345 days.

(21) Appl. No.: 13/065,254

(22) Filed: Mar. 17, 2011

(65) Prior Publication Data
US 2012/0239647 A1 Sep. 20, 2012

(51) Int. Cl.
G10L 19/14 (2006.01)

(52) U.S. Cl.
USPC ............................ 704/273; 713/176; 380/237

(58) Field of Classification Search
USPC ........... 704/205–207, 273; 713/176; 380/337, 380/241
See application file for complete search history.

(56) References Cited

U.S. PATENT DOCUMENTS

| | | | |
|---|---|---|---|
| 4,683,586 A * | 7/1987 | Sakamoto et al. | 380/237 |
| 6,150,598 A * | 11/2000 | Suzuki et al. | 84/603 |
| 6,345,252 B1 | 2/2002 | Beigi et al. | |
| 6,829,368 B2 | 12/2004 | Meyer et al. | |
| 6,990,453 B2 | 1/2006 | Wang et al. | |
| 7,130,892 B2 | 10/2006 | Mukai | |
| 7,277,766 B1 | 10/2007 | Khan et al. | |
| 7,487,180 B2 | 2/2009 | Holm et al. | |
| 7,516,074 B2 | 4/2009 | Bilobrov | |
| 7,549,052 B2 | 6/2009 | Haitsma et al. | |
| 7,605,320 B2 | 10/2009 | Le et al. | |
| 7,624,012 B2 | 11/2009 | Pachet et al. | |
| 7,627,477 B2 | 12/2009 | Wang et al. | |
| 7,707,425 B2 | 4/2010 | Mihcak et al. | |
| 7,715,934 B2 | 5/2010 | Bland et al. | |
| 7,853,344 B2 | 12/2010 | Khan et al. | |
| 7,865,368 B2 | 1/2011 | Li-Chun Wang et al. | |
| 2003/0195851 A1 | 10/2003 | Ong | |
| 2004/0133548 A1 | 7/2004 | Fielding et al. | |
| 2004/0215447 A1 | 10/2004 | Sundareson | |
| 2006/0229878 A1 * | 10/2006 | Scheirer | 704/273 |
| 2007/0220592 A1 | 9/2007 | Muehlbauer | |
| 2008/0249982 A1 | 10/2008 | Lakowske | |
| 2008/0263360 A1 | 10/2008 | Haitsma et al. | |
| 2009/0205483 A1 | 8/2009 | Kim | |
| 2010/0005951 A1 | 1/2010 | Le et al. | |
| 2010/0228736 A1 | 9/2010 | Kahlbaum et al. | |
| 2010/0257129 A1 | 10/2010 | Lyon et al. | |
| 2011/0060432 A1 * | 3/2011 | Liu | 700/94 |
| 2012/0265993 A1 * | 10/2012 | Srinivasan et al. | 713/176 |

* cited by examiner

*Primary Examiner* — Abul Azad
(74) *Attorney, Agent, or Firm* — Meroni & Meroni, P.C.; Charles F. Meroni, Jr.; Christopher J. Scott (57) ABSTRACT

A file-identifying fingerprint or marker is associated with a media/audio file after waveform values are extracted therefrom via certain data extraction and/or audio analysis routines. The extracted waveform values are statistically manipulated so as to render an array of statistical values for the analyzed media/audio file, which are then compiled to form the custom marker, and embedded with the metadata of the media/audio file thereby marking the media/audio file. The custom marker or fingerprint can be matched against a set of reference fingerprints (e.g., in a database) to determine the identity of the signal or the similarity between two signals. Because of the nature of the fingerprint extraction algorithm, it does not suffer from many of the problems that plague existing solutions, and as compared to such solutions it is fast, efficient, highly accurate, scalable, and robust.

28 Claims, 4 Drawing Sheets

SYSTEM AND METHOD FOR CUSTOM MARKING A MEDIA FILE FOR FILE MATCHING

BACKGROUND OF THE INVENTION

1. Field of the Invention

The present invention generally relates to system and method for audio signal processing. More particularly, the present invention relates to a system and method for extracting characteristic audio signal values, calculating signature metrics therefor, and associating custom markers with signal sources for matching purposes.

2. Brief Description of the Prior Art

As is noted in U.S. Pat. No. 7,516,074 (the '074 Patent), which issued to Bilobrov, variations in file formats, compression technologies, and other methods of representing data, the ability to quickly identify an otherwise uniform data signal for comparison purposes often raises certain technical difficulties. The relatively recent prior art developed in this field of inquiry is somewhat well-developed, and typically requires a great deal of data extraction in order to properly match audio files with one another. Some of the more pertinent prior art relating to (audio) file matching techniques and the like are briefly described hereinafter.

U.S. Pat. No. 6,990,453 ('453 Patent), which issued to Wang et al., discloses a System and Method of Recognizing Sound and Music Signals in High Noise and Distortion. The '453 Patent describes a method for recognizing an audio sample locates an audio file that most closely matches the audio sample from a database indexing a large set of original recordings. Each indexed audio file is represented in the database index by a set of landmark time points and associated fingerprints. Landmarks occur at reproducible locations within the file, while fingerprints represent features of the signal at or near the landmark time points. To perform recognition, landmarks and fingerprints are computed for the unknown sample and used to retrieve matching fingerprints from the database.

For each file containing matching fingerprints, the landmarks are compared with landmarks of the sample at which the same fingerprints were computed. If a large number of corresponding landmarks are linearly related, i.e., if equivalent fingerprints of the sample and retrieved file have the same time evolution, then the file is identified with the sample.

The method can be used for any type of sound or music, and is particularly effective for audio signals subject to linear and nonlinear distortion such as background noise, compression artifacts, or transmission dropouts. The sample can be identified in a time proportional to the logarithm of the number of entries in the database; given sufficient computational power, recognition can be performed in nearly real time as the sound is being sampled.

U.S. Pat. No. 7,277,766 ('766 Patent), which issued to Khan et al., discloses a Method and System for Analyzing Digital Audio Files. The '766 Patent describes a method and system for analyzing audio files wherein plural audio file feature vector values are based on an audio file's content are determined and the audio file feature vectors are stored in a database that also stores other pre-computed audio file features. The process determines if the audio files feature vectors match the stored audio file vectors. The process also associates a plurality of known attributes to the audio file.

The '074 Patent describes a technique for extracting an audio fingerprint from an audio sample, where the fingerprint contains information that is characteristic of the content in the sample. The fingerprint may be generated by computing an energy spectrum for the audio sample, resampling the energy spectrum logarithmically in the time dimension, transforming the resampled energy spectrum to produce a series of feature vectors, and computing the fingerprint using differential coding of the feature vectors. The generated fingerprint can be compared to a set of reference fingerprints in a database to identify the original audio content.

U.S. Pat. No. 7,549,052 ('052 Patent), which issued to Haitsma et al., discloses a method for Generating and Matching Hashes of Multimedia Content. The disclosed method generates robust hashes for multimedia content, for example, audio clips. The audio clip is divided into successive frames. For each frame, the frequency spectrum is divided into bands. A robust property of each band is computed and represented by a respective hash bit.

An audio clip is thus represented by a concatenation of binary hash words, one for each frame. To identify a possibly compressed audio signal, a block of hash words derived therefrom is matched by a computer with a large database. Such matching strategies are also disclosed. In an advantageous embodiment, the extraction process also provides information as to which of the hash bits are the least reliable. Flipping these bits considerably improves the speed and performance of the matching process.

U.S. Pat. No. 7,624,012 ('012 Patent), which issued to Pachet et al., discloses a Method and Apparatus for Automatically Generating a General Extraction Function. The '012 Patent describes a general function generator operative on an input signal to extract from the latter a value of a global characteristic value expressing a feature of the information conveyed by that signal.

It operates by generating at least one compound function, said compound function being generated from at least one of a set of elementary functions by considering the elementary functions as symbolic objects, operating said compound function on at least one reference signal having a pre-attributed global characteristic value serving for evaluation, by processing the elementary functions as executable operators, determining the matching between: i) the value(s) extracted by said compound function as a result of operating on said reference signal and, ii) the pre-attributed global characteristic value of said reference signal, and selecting at least one compound function on the basis of the matching to produce the general extraction function. The invention can be used, for instance, for the automatic extraction of audio/music descriptors from their signals contained as music file data. Notably, the method utilizes means and variances.

U.S. Pat. No. 7,627,477 ('477 Patent), which also issued to Wang et al., discloses a Robust and Invariant Pattern Matching technique. The '477 Patent describes an innovative technique for rapidly and accurately determining whether two audio samples match, as well as being immune to various kinds of transformations, such as playback speed variation. The relationship between the two audio samples is characterized by first matching certain fingerprint objects derived from the respective samples. A set of fingerprint objects based on audio sample amplitude information is generated for each audio sample.

Each location is determined in dependence upon the content of the respective audio sample and each fingerprint object characterizes one or more local features at or near the respective particular location. A relative value is next determined for each pair of matched fingerprint objects. A histogram of the relative values is then generated. If a statistically significant peak is found, the two audio samples can be characterized as substantially matching.

U.S. Pat. No. 7,707,425 ('425 Patent), which was issued to Mihcak et al. (and assigned to Microsoft), discloses a Recognizer of Content of Digital Signals. The '425 Patent describes a computer-implemented method facilitating identification of a digital signals comprising the steps of obtaining a digital signal; deriving an identification value representative of the digital signal such that perceptually distinct digital signals result in identification values that are approximately independent of one another and perceptually digital signals result in identical identification values, wherein the deriving comprises a series of steps.

The digital signal is transformed into a digital signal transform whereafter the digital signal transform is randomly divided into multiple chunks, each chunk containing signal data, wherein the dividing is carried out recursively to form hierarchical levels of overlapping chunks. Each of the chunks is averaged and the signal data produce corresponding chunk averages. An exponential distribution having multiple distinct quantization levels is generating based, in part, on the chunk averages. Each of the chunk averages is randomly rounded to one of the quantization levels to produce rounded values; a composite of the rounded values is then hashed; and the digital signal using the identification value is indexed.

U.S. Pat. No. 7,715,934 ('934 Patent), which was issued to Bland et al., discloses a technique for Identification of Input Files using Reference File. The '934 Patent describes an input profile which is generated from an input audio file using a measurable attribute that was also used to generate reference profiles from reference audio files.

The input profile is then subjected to a process that was also used to generate a reference profiles tree, which is structured as a sparse binary tree, from the reference profiles. As a result of the process, information of reference profiles having similar characteristics as the input profile, with respect to the measurable attribute, are retrieved from resulting nodes of the reference profiles tree. The input profile is then compared with this subset of the reference profiles, representing potential matches, to determine that either it matches one of the reference profiles, or that it is a spoof, or that it does not match any of the reference profiles.

United States Patent Application Publication No. 2003/0195851, which was authored by Ong, describes a system and method for managing distribution of digital audio content employing vector encoding of audio content representing segments of the audio waveform. High frequency vectors are discriminated by their amplitude increment per short traversal times exceeding a predetermined level, and are flagged in the audio data file. A distributor or host ID code is embedded in the audio data file designating the authorized source or host environment for playback of the audio data file. A vector-decoding-enabled player associated with the authorized host is allowed to playback the audio data file with full quality and an unlimited number of times.

If the audio data file is copied or downloaded to a new host environment, then the player associated with the new host will detect that the host ID code embedded in the audio data file does not match the new host, and will playback only the low frequency vectors of the audio data file and only for a limited number of times. The recipient of the audio data file is required to log-on to an online registration site and pay a license fee in order to obtain a host-ID code for the audio data file matching the current host environment in order to have full usage rights. The system allows multiple users to sample or share copies of the vector-encoded audio data files on peer-to-peer networks without infringing the rights of copyright holders. An improvement for flattening out noisy input signals is also provided in the method of vector encoding of the audio waveforms.

United States Patent Application Publication No. 2004/0215447, which was authored by Sundareson, describes an audio file which is divided into frames in the time domain and each frame is compressed, according to a psycho-acoustic algorithm, into file in the frequency domain. Each frame is divided into sub-bands and each sub-band is further divided into split sub-bands. The spectral energy over each split sub-band is averaged for all frames. The resulting quantity for each split sub-band provides a parameter.

The set of parameters can be compared to a corresponding set of parameters generated from a different audio file to determine whether the audio files are similar. In order to provide for the higher sensitivity of the auditory response, the comparison of individual split sub-bands of the lower order sub-bands can be performed. Selected constants can be used in the comparison process to improve further the sensitivity of the comparison. In the side-information generated by the psycho-acoustic compression, data related to the rhythm, i.e., related percussive effects, is present. The data known as attack flags can also be used as part of the audio frame comparison.

United States Patent Application Publication No. 2007/0220592, which was authored by Muehlbauer, describes a computer system and method executing artificial intelligence that audits media files (audio, video and graphical image, and/or other content) submitted for a Universal Media Code (UMC) database cataloging to minimize duplicate claims of ownership.

In some embodiments, during the cataloging of media files into the UMC database, the system performs a comparison of the description, location, file format and fingerprint with other UMC database content. Once the new UMC media file is declared unique by the system, the UMC record is enabled for Internet distribution. If a question of duplication arises, the system notifies the audit administrator who will manually take over the investigation and enabling process.

United States Patent Application Publication Number 2007/0276668, which was authored by Xu et al., describes a method and apparatus for accessing at least one audio file from a collection comprising more than one audio file stored within or accessible with an electronic device. The method includes generating one index comprising information entries obtained from each of the more than one audio file in the collection, with each audio file in the collection information being linked to at least one information entry; receiving a vocal input during a voice reception mode; converting the vocal input into a digital signal using a digital-analog converter; analyzing the digital signal using frequency spectrum analysis into discrete portions; and comparing the discrete portions with the entries in the index. It is advantageous that the audio file is accessed when the discrete portions substantially match at least one of the information entries in the index. It is preferable that the discrete portions are either musical notes or waveforms.

United States Patent Application Publication Number 2008/0249982, which was authored by Lakowske, describes certain systems and methods for identifying audio files (e.g., music files) with user-established search criteria. The systems and methods allow a user to use an audio file to search for audio files having similar audio characteristics. The audio characteristics are identified by an automated system using statistical comparison of audio files. The searches are preferably based on audio characteristics inherent in the audio file submitted by the user.

United States Patent Application Publication Number 2009/0205483, which was authored by Kim, describes a music recognition method based on harmonic features and a motion generation method for a mobile robot. It is here being cited based on its aspect of extracting harmonic peaks for further usage. The music recognition method preferably includes: extracting harmonic peaks from an audio signal of an input song; computing a harmonic feature related to the average of distances between extracted harmonic peaks; and recognizing the input song by harmonic component analysis based on the computed harmonic feature.

The motion generation method for a mobile robot includes: extracting a musical feature from an audio signal of an input song; generating an initial musical score after identifying the input song on the basis of the extracted musical feature; generating a final musical score by synchronizing the initial musical score and musical feature together; and generating robot motions or a motion script file by matching a motion pattern of the mobile robot with the final musical score.

From a consideration of the foregoing, it will be noted that the prior art appears to be silent on a technique for extracting summary data from audio file amplitude information comprising twenty-two (22) characteristic matching metrics for providing distinct audio file signatures for significantly decreasing the time associated with proper file matching. Accordingly, the prior art perceives a need for a fast-match method of the foregoing type, which method or technique is described and/or summarized in more detail hereinafter.

SUMMARY OF THE INVENTION

It is an object of the present invention to create certain means for finding audio file matches on different systems without the requirement of sending cumbersome loads of data or the audio files themselves. It is a further object of the present invention to provide certain support means for determining which audio files should be synced to a certain system, and which audio files are already present and simply need to be referenced. Still further, it is an object of the present invention to provide certain means to effectively find and locate redundant files so as to reduce storage costs by eliminating redundant file storage.

Accordingly, the present invention enables a file-identifying fingerprint or file-identifying value to be extracted from an audio signal based on amplitude information of that signal. This fingerprint can be matched against a set of reference fingerprints (e.g., in a database) to determine the identity of the signal or the similarity between two signals. Because of the nature of the fingerprint extraction algorithm, it does not suffer from many of the problems that plague existing solutions, and as compared to such solutions it is fast, efficient, highly accurate, scalable, and robust, each sampled audio file requiring something on the order of 1-3 seconds to match with an error rate of less than one per one hundred thousand.

In other words, the present invention describes and/or sets forth certain techniques or methodologies for providing a highly accurate, efficient, and rapid way of matching audio files regardless of bit-rate, file compression, sampling rate, etc. In order to achieve this fast file-matching the technique according to the present invention limits the data extraction to just metrics taken from the general amplitude of an audio file. In this regard, it is noted that data extraction is by far the most time consuming portion of the process.

Accordingly, since the current technique involves a single episode of data analysis and extraction, the overall amount of time required to complete the process of creating file markers is drastically cut. Further, in order to avoid splicing the audio file to create a significant number of data points to validate a match, the present invention extracts a maximized amount of distinct summary data from the amplitude information.

According to the present invention, at least twenty-two (22) such pieces of extraction data are ascertained from the amplitude information of a file, after wish ID3 tags associated with amplitude data values are embedded into metadata for identifying the respective files.

Applications of embodiments of the fingerprinting technology are numerous, and they include the real-time identification of audio streams and other audio content (e.g., streaming media, radio, advertisements, Internet broadcasts, songs in CDs, MP3 files, or any other type of audio content). Embodiments of the invention thus enable efficient, real-time media content auditing and other reporting.

It is contemplated that the primary usage of the presently disclosed system and method for file matching and/or matching metric extraction will be to reduce file redundancy on the user system and the back end cloud storage system. Another usage of the present system/methodology is to create file markers that can serve as the DNA or fingerprint of a media/audio file, which can then be sent to other user systems to determine if a matching media/audio file is present in a system, and whether or not a media/audio file has to be sent to a system in order to sync a play-list or track within a media player.

The custom markers afforded by the audio waveform value extraction and statistic rendering significantly increase the speed and efficiency of the contemplated syncing process. The custom markers may further be utilized to determine if a media/audio file needs to be uploaded to the server or if it currently resides on the server so that a URL stream can be created as soon as the play-list is created in the local system; in other words, and for example, it is contemplated that a user would not be required/troubled to endure undue wait time for the download to complete before listening and modifying the play-list and its tracks.

BRIEF DESCRIPTION OF THE DRAWINGS

Other features of our invention will become more evident from a consideration of the following brief descriptions of patent drawings.

DETAILED DESCRIPTION OF THE PREFERRED SYSTEM AND METHODOLOGY

Referring now to the drawings with more specificity, the preferred methodology according to the present invention concerns a system and method for associating a file-identifying fingerprint or marker with a media/audio file; and/or a system and method for matching media/audio files by way of uniquely constructed file-identifying markers or fingerprints.

From a systemic point of view, the present invention may thus be said to comprise various data processing means, including certain data input means; certain data extraction means; certain summary statistic or metric derivation means; certain custom marker generation means; certain marker association means; certain data storage means; certain data comparison means; and certain data output means.

Assembled around or within certain central (data) processing means as at 10 (as exemplified or typified by a computer or server), the data input means 11 are in communication with the data processing means 10 for communicating or inputting (as at 12) wave form media file data (as at 14) into the data extraction means 15 incorporated in, or otherwise in communication with the system or data processing means 10.

The data extraction means 15, as preferably exemplified by certain audio analysis means as typified by an audio analysis plugin (e.g. a GPL2 licensed vamp plugin as may be found at http://vamp-plugins.org/), are associated with the data processing means 10 for enabling waveform data extraction from the input or communicated wave form media file data 14. The process of extracting waveform data provides signature values 32, which may then be further processed via certain metric derivation means 31 for rendering or deriving matching metrics 16.

Figure 1:
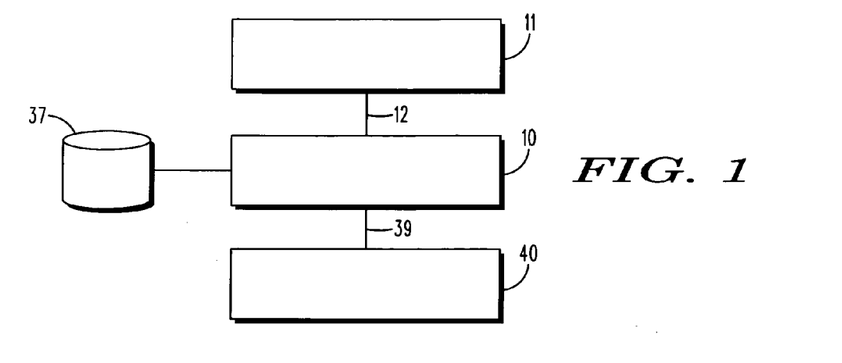
FIG. 1 is a block diagram of a basic data processing structure showing a data input block, a centralized data processing block, a data output block, and a database storage bin.
Figure 2A:
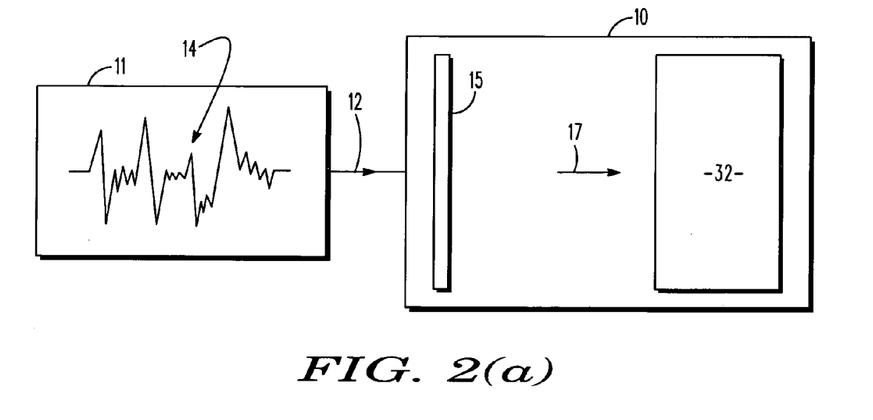
FIG. 2(a) is a first enhanced diagrammatic depiction of an initial data processing arrangement according to the present invention showing a wave form data input block and a centralized data processing block the latter of which comprises a waveform processing unit and an initial data output block.
Figure 2B:
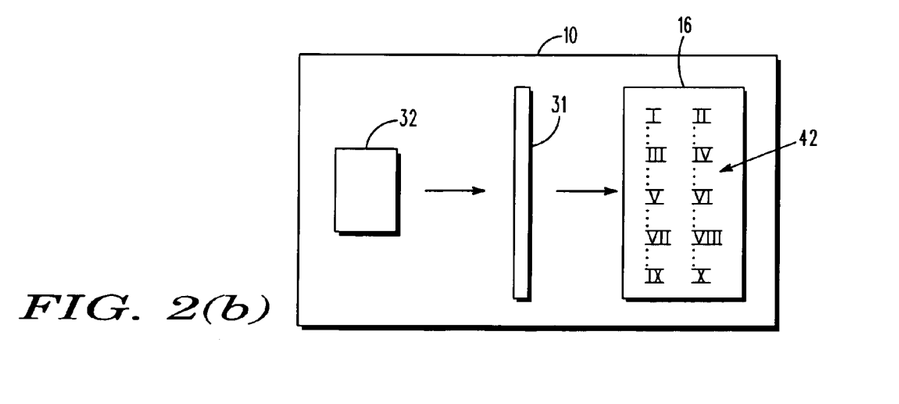
FIG. 2(b) is a second enhanced diagrammatic depiction of a secondary data processing arrangement according to the present invention showing the data output block from FIG. 2(a) being processed via an output processing unit and a secondary data output block.

For example, when wave form audio file data 14 are analyzed by the audio analysis plugin (as at 15), various values 32 may be rendered or output 17 from the wave form audio file data 14 as generally and generically depicted in FIG. 2(a). The values 32 may then be processed via certain metric derivation means 31 for deriving or rendering the so-called matching metrics 16 as generally and generically depicted in FIG. 2(b).

Figure 3:
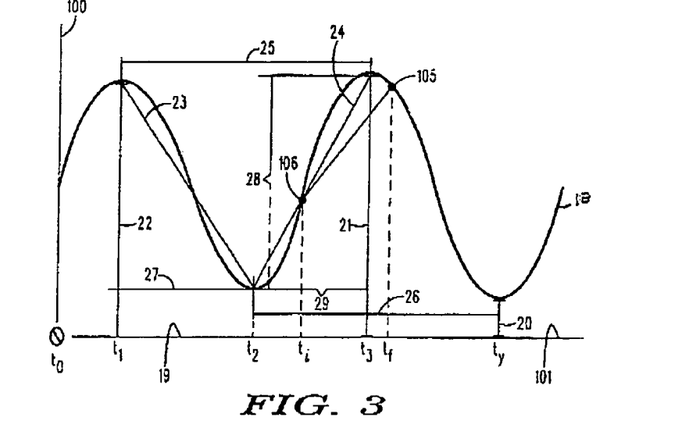
FIG. 3 is a graphical depiction of a generic sinusoidal waveform depicting audio amplitude information/data as a function of time.

Further referencing FIG. 3, the reader will see a generic sinusoidal wave 18. The generic sinusoidal wave 18 is positioned adjacent a baseline 19 in which waveform amplitude data (e.g. decibel level) are portrayed along the Y-axis 100 as a function of time as portrayed along the X-axis 101. It will be understood that wave form data (as at 14) as mapped and positioned adjacent a baseline (as at 19) may thus render various values 32.

The various values 32 are contemplated to include, but not be limited to: a trough height or trough-to-baseline distance or length segment as at 20; a peak height or peak-to-baseline distance or length segment as at 21; a vertical peak-to (rightly adjacent)-trough distance or length segment as at 22; a horizontal peak-to (rightly adjacent)-trough distance or length segment s at 27 (defining a certain time segment or Δt); and a peak-to-trough hypotenuse length segment (joining length segments 22 and 27, and having a certain slope) as at 23.

Further, the various values 32 are contemplated to include, but not be limited to: a vertical trough-to (rightly adjacent)-peak distance or length segment as at 28; a horizontal trough-to (rightly adjacent)-peak distance or length segment as at 29 (defining a certain time segment or Δt); a trough-to-peak hypotenuse length (joining length segments 28 and 29, and having a certain slope) as at 24; a peak-to-peak distance 25 (defining a certain time segment or Δt); and a trough-to-trough distance 26 (i.e. defining a certain time segment or Δt).

The values extracted from the wave form media file data 14 may thus be subjected to various statistical analyses for providing the matching metrics 16. By way of example, given a continuous waveform or wave form media file data 14, a number of trough-to-baseline distances or length segments 20 may be ascertained extending across a range of values with a certain arithmetic average and having certain variability associated therewith.

Figure 5:
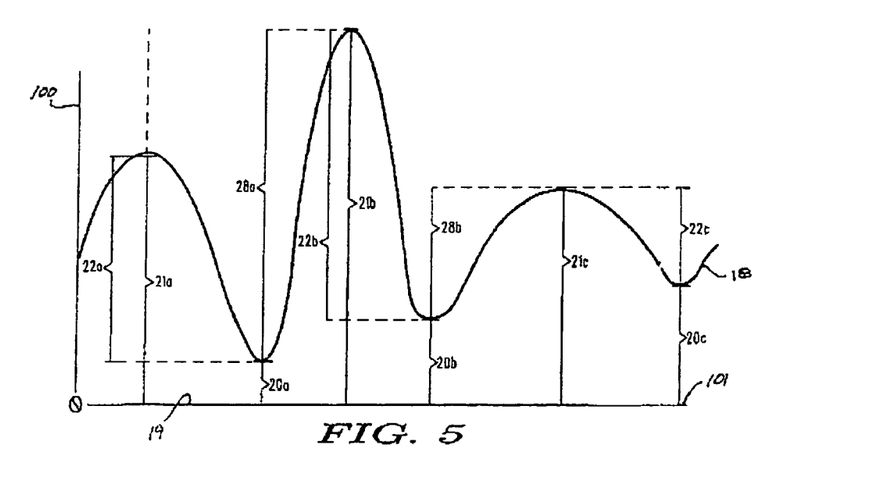
FIG. 5 is a first graphical depiction of a non-uniform waveform depicting audio amplitude information/data as a function of time with vertical wave components or length segments being highlighted.

Thus, it is contemplated that various statistical values including but not limited to the mean, range, and standard deviation values may be calculated for the trough-to-baseline distances or length segments (as at 20) of certain given audio file waveform data 14. In this regard, the mean may be defined by as an arithmetic average of the trough-to-baseline length segments 20 of the values 32. To find a mean, scores or distances or length segment values may be summed and divided by the number of scores, distances, or length segment values per the following equation:

$$\overline{X} = \frac{\Sigma X}{N}$$

where $\overline{X}$=the mean
$\Sigma$=an instruction to add or sum
X=the numbers or values symbolized by X
N=the number of X's Referencing FIG. 5, it will be seen that three (3) successive trough-to-baseline distances or length segments have been depicted and referenced at 20a, 20b, and 20c. The mean of the trough-to-baseline distances or length segment values as taken from FIG. 5, may thus be exemplified by the trough-to-baseline distances or length segment values depicted and referenced at 20a, 20b, and 20c. If the values are added/summed and divided by three, for example, an arithmetic average or mean is provided.

In other words, If trough-to-baseline distance or length segment 20a has a value of two (2); trough-to-baseline distance or length segment 20b has a value of four (4); and trough-to-baseline distance or length segment 20c has a value of six (6); the mean may be calculated to have a value of four (4) since the sum of the values is twelve (12), and the number of values is three (3) (twelve (12) divided by three (3) equals four (4)).

Figure 6:
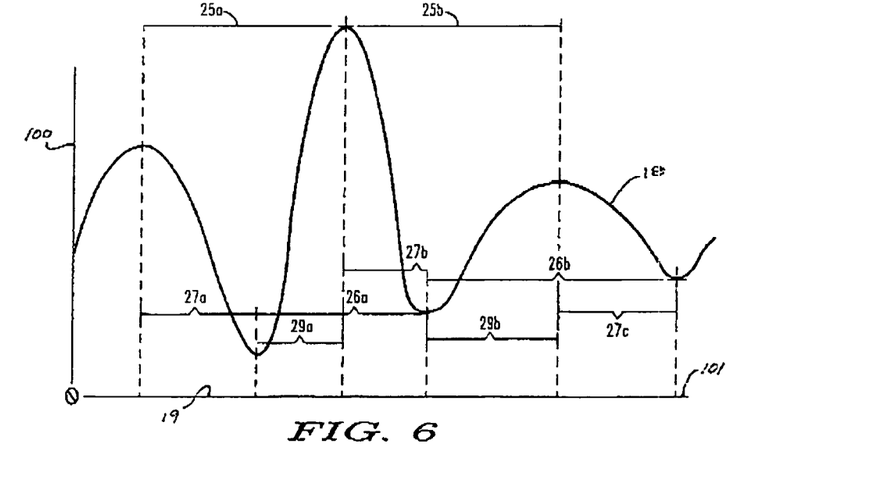
FIG. 6 is a second graphical depiction of a non-uniform waveform depicting audio amplitude information/data as a function of time with horizontal wave components or length segments being highlighted.
Figure 7:
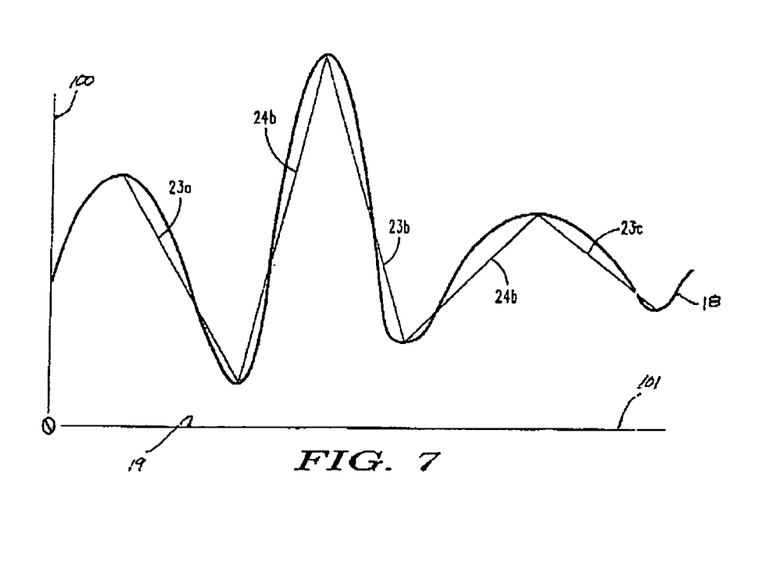
FIG. 7 is a third graphical depiction of a non-uniform waveform depicting audio amplitude information/data as a function of time with sloped wave components or length segments being highlighted.
Figure 8:
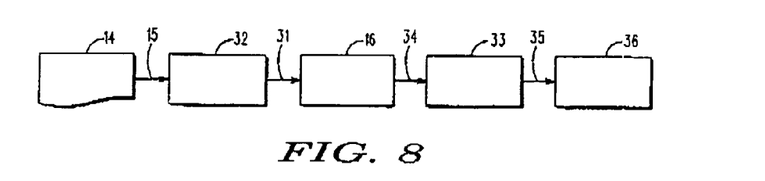
FIG. 8 is a flow diagram showing five blocks separated by four processes/processing units/routines.
Figure 9:
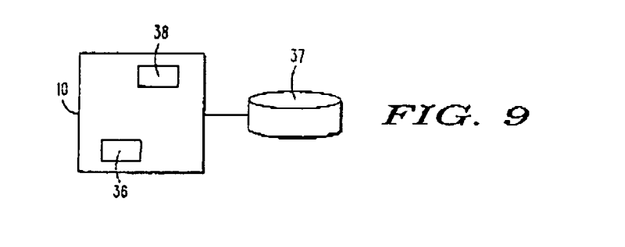
FIG. 9 is a block diagram of a basic data processing structure showing a centralized data processing block comprising two processing units and connected to a database storage bin.

Similar calculations may be carried out for (1) the peak-to-baseline distances or length segments 21a, 21b, and 21c (as depicted and referenced in FIG. 5); (2) the vertical peak-to-(rightly adjacent)-trough distances or length segments 22a, 22b, and 22c (as depicted and referenced in FIG. 5); (3) the horizontal peak-to-(rightly adjacent)-trough distances or length segments 27a, 27b, and 27c (as depicted and referenced in FIG. 6); and (4) the peak-to-trough hypotenuse length segment 23a, 23b, and 23c (as depicted and referenced in FIG. 7).

The reader is further directed to (5) the vertical trough-to-(rightly adjacent)-peak distances or length segments 28a and 28b (as depicted and referenced in FIG. 5); (6) the horizontal trough-to-(rightly adjacent)-peak distances or length segments 29a and 29b (as depicted and referenced in FIG. 6); (7) the trough-to-peak hypotenuse length segment 24a and 24b (as depicted and referenced in FIG. 7); (8) the peak-to-peak distances or length segments 25a and 25b (as depicted and referenced in FIG. 5); and (9) the trough-to-trough distances or length segments 26a and 26b (as depicted and referenced in FIG. 6).

Each respective set of length segment values may thus be summed and the resulting sum sets divided by the number of values in each set to render an arithmetic mean for the respective set. In addition to the means, range values and standard deviation values for each given set may also be calculated to provide additional and characteristic statistical signatures for the wave form data 14. All statistical metrics can then be utilized to provide a robust file-identifying marker or fingerprint for the given wave form data 14 of a media/audio file.

With regard to the range, the same may be defined as the upper limit of the trough-to-baseline distance or length segment 20 with the greatest magnitude (i.e. the highest score or value) minus the lower limit of the trough-to-baseline distance or length segment with the lowest magnitude (i.e. the lowest score) as per the following equation:

$$\text{range} = X_H - X_L$$

where $X_H$=upper limit of the highest or greatest trough-to-baseline distance; and $X_L$=lower limit of the lowest or least trough-to-baseline distance.

Again referencing FIG. 5, the three (3) successive trough-to-baseline distances or length segments have been depicted and referenced at segments 20a, 20b, and 20c. In this example, length segment 20a would appear to represent the trough-to-baseline distance or length segment having least magnitude or value, and length segment 20c would appear to represent the trough-to-baseline distance or length segment of greatest magnitude.

If trough-to-baseline distance or length segment 20a were assigned a value of 2 and the trough-to-baseline distance or length segment 20c were assigned a value of 6, the range might then be calculated to have a value of 5 (since the lower limit of 2 in this example is 1.5 and the upper limit of 6 in this example is 6.5).

With regard to the parameter/statistic of standard deviation, it is noted that the same is a measure of variability of a given set of scores such as distances, length segments, or values, and may be given by the following formula:

$$\sigma \text{ or } S = \sqrt{\frac{\Sigma X^2 - \frac{(\Sigma X)^2}{N}}{N}}$$

where σ=standard deviation of a population;
S=standard deviation of a sample
N=number of deviations (or number of scores/distances/values)
$\Sigma X^2$=sum of the squared scores/distances/values
$(\Sigma X)^2$=square of the sum of the raw scores/distances/values When auditory amplitude data (e.g. intensity) are mapped as a function of time, the resulting data may define a signature waveform. Rather than extracting all the auditory amplitude data from the waveform, the present invention extracts key values, and derives file-matching metrics from the values as exemplified by the foregoing values 32 to provide a signature or fingerprint or custom marker for the respective audio file data so as to quicken the overall matching process without sacrificing accuracy.

It is contemplated that the foregoing are but examples of the types of data that may be extracted from a given waveform. Other statistical features and/or values may be extracted so as to render the custom marker for insertion and/or association with the respective media/audio file. For example, peak-to (rightly adjacent)-trough arc length (or portion(s) thereof) values as at 41 and/or trough-to (rightly adjacent)-peak arc length (or portion(s) thereof) value as at 42 could also be extracted, and statistical values derived therefor.

Figure 4:
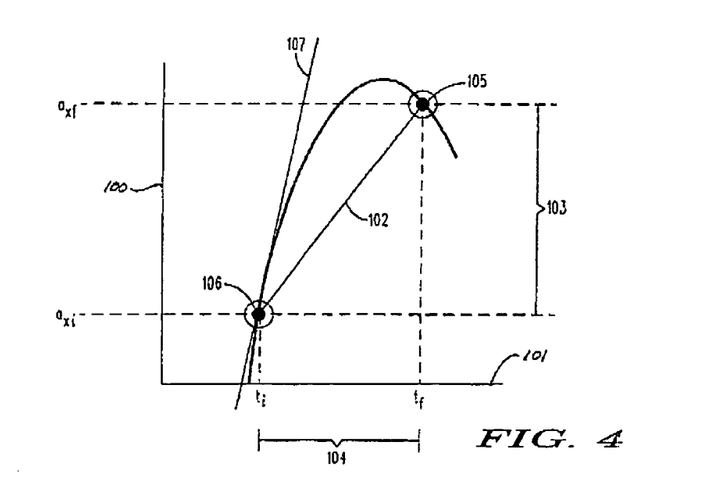
FIG. 4 is an enhanced fragmentary graphical depiction of a portion of the generic sinusoidal waveform otherwise depicted in FIG. 3 showing a tangent slope at a point on the waveform.

Further, suppose an auditory signal has a certain amplitude magnitude A at time $t_i$ and a certain amplitude magnitude A at time $t_f$. The average amplitude magnitude $\overline{A}_x$ of the audio signal may be defined as the change in amplitude $\Delta a_x$ divided by the time interval $\Delta t$ during which that change occurred as per the following equation:

$$\overline{A}_x \equiv \frac{\Delta a_x}{\Delta t} = \frac{a_{xf} - a_{xi}}{t_f - t_i}$$

where $\overline{A}_x$ is depicted and referenced at 102, $\Delta a_x$ is depicted and referenced at 103, and $\Delta t$ is depicted and referenced at 104 in FIG. 4.

Notably, the value of the average amplitude magnitude $\overline{A}_x$ may be different over different time intervals. It is therefore useful to define the instantaneous amplitude magnitude as the limit of the average amplitude magnitude as $\Delta t$ approaches zero. If point 105 is brought closer to point 106 in FIG. 4, and the limit of $[\Delta a]\_x/\Delta t$ is taken as $\Delta t$ approaches zero, the instantaneous amplitude magnitude (or slope) may be found as at 107. In other words, it is contemplated that the slope (as at 107) of the waveform data at any given time may also be extracted and utilized to provide a file-identifying fingerprint or marker for the audio file waveform data 14.

It will thus be understood from an inspection of the various figures that the values at 20, 21, 22, and 28 are static length segment values based on instantaneous time selections; the values 25, 26, 27, and 29 may be viewed as either static length time segment values or time segment values; and the values 23 and 24 may be viewed as length segment values or time-based derivative values dependent upon select choice of the $\Delta t$ component. In this regard, it is contemplated that in some situations, the slope values may significantly differ over different time intervals, and thus it may thus be useful to define the instantaneous slope as a limit of the average slope as $\Delta t$ approaches zero.

It will thus be seen that the data extraction means 15 according to the present invention may well function to render certain amplitude values 32, from which values 32 certain summary statistics or metrics 16 may be derived and thus the present system and method contemplate that the data extraction means 15 may well support certain statistic/metric derivation means 31 as provided by way of certain proprietary testing/software designed to render the matching metrics 16 as exemplified by the foregoing statistics/parameters.

To further bolster the accuracy of the matching metrics 16, it is contemplated that values for each of the distances, length segments and/or slopes may be summarized by a set of summary statistics inclusive of the mean values, range values, and standard deviation values otherwise calculated for the values 32. In other words, the arithmetic average (i.e. the mean) of all the means for the various amplitude aspects could conceivably be calculated and included as a matching metric to bolster the accuracy of the signature or fingerprint or marker.

Still further, in addition to extraction of values 32 and matching metrics 16 from the wave form audio file data 14, it is contemplated that an audio file duration parameter/statistic or metric may be included among the matching metrics 16 to further bolster signature accuracy. In other words, respective media/audio files necessarily comprise a signature duration, and the duration aspect or feature of the respective media/audio files may thus contribute to the authenticity or accuracy of a given file marker.

In this last regard, it is contemplated that the resulting summary statistics or matching metrics 16 may then be inserted into or otherwise embedded in the metadata of the media/audio file using a custom file-identifying fingerprint or marker such as an (extended) ID3 tag as generally referenced at 33. It is noted that tags of this type offer, provide, or enable relatively rapid file matching via file comparison means or operators. Thus, the ID3 tag or similar other custom marker, can be accessed very quickly when trying to find a possible match.

The present system and method thus contemplate that certain custom marker generation means 34 and certain marker association means 35 for associating (i.e. embedding) the custom markers into the metadata of the respective audio files thereby creating custom marked or fingerprinted media/audio file(s) as at 36. The custom marked media/audio files 36 may thereafter be stored within certain data storage means 37 associated with the data processing means 10 such that certain data comparison means 38 (also associated with the data processing means 10) may well function to compare unmarked media files (as at 11) to marked media files 36.

It is contemplated that the data comparison means 10 may well function to access the custom markers 33 when comparing unmarked media file data with marked media file data for rendering or outputting media file match status (i.e. a positive or negative match). Certain data output means 40 associated with the data processing means 10 may output 39 the media file match status for further processing.

When viewed from a methodological perspective, the present invention may be said to set forth certain methodology for associating a file-identifying fingerprint or marker with a media/audio file and/or for matching media/audio files with associated file-identifying markers or fingerprints. The method(s) may be said to comprise a series of steps as described in more detail hereinafter.

A first or test media or audio file is directed or filtered through a media or audio file analysis plugin or similar other data extraction means 15 for outputting wave form property values 32. It is contemplated that the wave properties of an input audio file wave form each preferably have a wave value calculable relative to a data extraction baseline 19, as for example the trough-to-baseline length segment(s) 20 and the peak-to-baseline length segment(s) 21.

Wave values 32 may thus be calculated from the wave properties of the media/audio file via the audio analysis plugin 15, which wave values may preferably define (instantaneous) length segment values as exemplified by trough-to-baseline distances or length segments 20, peak-to-baseline distances or length. segments 21, vertical peak-to-trough distances or length segments 22, vertical trough-to-peak distances or length segments 28, peak-to-peak distances or length segments 25, and trough-to-trough distances or length segments 26.

Certain statistical or parametrical values may then be calculated by way of statistic derivation means 31 for the length segment values as exemplified by mean, range, and standard deviation values. The statistical or parametrical values thus provide or generate an array of values (as at 42) and a custom, file-identifying fingerprint or marker 33 based on the array of values 42 may be embedded into the metadata of (or otherwise associated with) the first or test media/audio file for enabling subsequent file matching via certain file comparison routines/means as at 38.

The method may comprise the additional steps of selecting a series of time segments (select Δt's) from a data extraction timeline (parallel to or extending along the baseline 19) for providing derivative wave values; extracting such derivative wave values via the selected time segments; and calculating mean, range, and standard deviation values for the derivative wave values; and generating the array of values as at 42 inclusive of the derivative wave values. The array of values 42 may further include or define a series of summary metrics or values from which mean, range, and standard deviation values may be calculated for inclusion in the array of values.

The method further contemplates the collection of a value sampling from the array of values 42 for enabling or enhancing consistency with subsequent file matching based on the file-identifying fingerprint or marker. In this regard, it is contemplated that the value sampling may preferably be randomly collected and derived from averaging three select data points as selected from the wave form audio file data 14.

In other words, a value sampling may be taken from multi point averages (randomly) scattered through the duration of the audio file. It is noted that since the matching system is based on statistical averages it would be possible to negatively affect the matching process by providing a reversed media or audio file possibly negatively affect the file matching process. To avoid this foreseeable problem, it is contemplated that the present system and/or methodology may avail itself of a scattering of random samples across the array of amplitude values.

It is thus contemplated that the sample values may be collected from the same instantaneous, time-marked portions of the media/audio files to enable or enhance consistent file matching. The sample may preferably be a three point average of the amplitude values in the selected portion of the media/audio file. These will also serve to bolster the accuracy of the file matching process.

As earlier stated, the purpose of fast match is to provide a rapid (≈1-3 seconds per audio file), highly accurate, and very efficient way of matching media/audio files, despite their bit-rate, compression, sampling rate etc. In order to achieve this fast file matching the present system and method or process analyzes only the general amplitude information from a media/audio file. It is noted that data extraction is by far the most time consuming portion of the process. Limiting data extraction to amplitude information from a single analysis drastically cuts the time it takes to complete the process of creating file markers.

Further, in order to avoid splicing the audio file to create a significant number of data points to validate a match, the present system and method extracts as much distinct summary data/metrics from the amplitude information of the wave form media/audio data as possible as exemplified by the specifications hereinabove. The so-called matching metrics will provide a distinctive sampling of the audio file and create a marker that can be created from the extraction of just the amplitude.

In summation, it will thus be seen that the media/audio file does not have to be segmented into bins to create points of data validation. By including the so-called matching metrics 16 in the metadata, matching speed is significantly enhanced. The process for fast matching begins with the extraction of amplitude data from the audio file. After the data is extracted, a series of tests create a number of summary statistics of the different characteristics of the amplitude wave.

The resulting summary stats are inserted into the metadata of the target media/audio file as exemplified by a custom ID3 tag which can then be accessed very quickly when trying to find a possible match. Along with the data extraction, it is contemplated that an average margin of error for each one of the summary statistics can be created so as to provide a margin of error and a general model for file matching.

In this regard, it is contemplated that margin of error will be no more than one error per 100,000 file matches. Every file that falls within the margin of error (a pre-determined number of standard deviations from the average differentiation on matching files) on all of the summary stats and has a matching duration will be considered a match.

While the foregoing specifications set forth much specificity, the same should not be construed as setting forth limits to the invention but rather as setting forth certain preferred embodiments and features. For example, as prefaced hereinabove, it is contemplated that the present inventive system and methodology essentially provide means for associating a file-identifying marker with a media/audio file and a media/audio file matching method.

The method may be said to comprise the steps of directing a medial file through data extraction means; extracting waveform data from the media file relating to distances or length segments; calculating a series of statistical values for the length segments; generating a custom file marker based on the statistical values; and associating the file marker with the media file. The method may involve data extraction relative to a baseline and thus comprise baseline related distances or length segments for which statistical values may also be generated. Further, given that the wave form data are mapped as a function of time, time based derivative values may also be extracted and statistically defined for bolstering the strength of the file signature.

The media/audio file matching method may be said to comprise the steps of extracting waveform data from a test audio file via an audio analysis plugin; compiling and/or deriving summary statistics from the extracted waveform data; generating a custom marker based on the compiled summary statistics; inserting the custom marker into metadata of the test audio file; storing the test audio file with inserted custom marker into a marked audio file database; comparing a secondary audio file to the test audio file; and accessing the custom marker when comparing the secondary audio file to the test audio file for rendering a positive audio file match.

Central to the process is the data extraction and summary statistical routines for rendering a robust file signature. Thus, the media file matching method may be said to essentially comprise the steps of extracting waveform data from a first media file via data extraction means; deriving summary statistics from the extracted waveform data; generating a custom marker based on the compiled summary statistics; associating the custom marker with the first media file thereby marking the first media file; storing the marked media file in a marked media file database; and accessing the custom marker when comparing a second media file to the marked media file for rendering a positive media file match.

The media file matching system according to the present invention may be said to essentially comprise certain data processing means; data input means for inputting media file data into the data processing means; data extraction means for enabling waveform data extraction from input media file data; summary statistic derivation means for deriving summary statistics from extracted waveform data; custom marker generation means for generating a custom marker based on derived summary statistics; marker association means for respectively associating generated custom markers with the media file data; data storage means for storing marked media file data; data comparison means for comparing unmarked media files to marked media files; and data output means for outputting media file match status.

Accordingly, although the present invention has been described by reference to certain preferred systemic arrangements and certain methodologies, it is not intended that the novel arrangements and methods be limited thereby, but that modifications thereof are intended to be included as falling within the broad scope and spirit of the foregoing disclosures and the appended drawings.

We claim:

1. A media file marking system, the media file marking system for custom marking media files, said media file marking system comprising:

data processing means;

data extraction means, the data extraction means being associated with the data processing means for enabling waveform data extraction from media file data, the waveform data comprising length segment values, the waveform data extraction being relative to a data extraction baseline for extracting trough-to-baseline and peak-to-baseline length segment values;

summary statistic derivation means, the summary statistic derivation means being associated with the data processing means for deriving calculated statistical values for the length segment values, the calculated statistical values being for the trough-to-baseline and peak-to-baseline length segment values;

custom marker generation means, the custom marker generation means being associated with the data processing means for generating a custom marker based on derived summary statistics; and marker association means, the marker association means being associated with the data processing means for respectively associating generated custom markers with the media file data for forming marked media file data.

2. The media file marking system of claim 1 for media file matching, said system comprising:

data storage means, the data storage means being associated with the data processing means for storing marked media file data; and data comparison means, the data comparison means being associated with the data processing means for comparing unmarked media files to stored marked media files, the data comparison means accessing the custom markers when comparing unmarked media file data with marked media file data for outputting media file match status.

3. The media file marking system of claim 1 wherein the waveform data are time dependent, the data extraction means for extracting time-based derivative wave values from the waveform data, the summary statistic derivation means for deriving calculated statistics for the time-based derivative wave values.

4. The media file marking system of claim 1 comprising value sampling means, the value sampling means being associated with the data processing means for deriving a value sampling from the calculated statistics.

5. The media file marking system of claim 4 wherein the value sampling means randomly collects the value sampling from a number of select data points associated with the calculated statistics.

6. The media file marking system of claim 5 wherein the value sampling means randomly collect the value sampling by averaging three select data points associated with the calculated statistics.

7. A method for associating a file-identifying fingerprint with an audio file, the method comprising the steps of:
   analyzing an audio file via analysis means, the audio file having a series of wave properties, the wave properties each having a calculable wave value;
   calculating wave values from the wave properties via the analysis means, the wave values comprising length segment values;
   calculating mean, range, and standard deviation values for the length segment values;
   generating an array of values based on the calculated mean, range, and standard deviation values;
   generating a file-identifying fingerprint based on the array of values; and
   associating the file-identifying fingerprint with the audio file for enabling subsequent file matching.

8. The method of claim 7 wherein the wave properties are time dependent, the method comprising the steps of:
   selecting a series of time segments for providing derivative wave values;
   extracting derivative wave values via the selected time segments;
   calculating mean, range, and standard deviation values for the derivative wave values; and
   generating the array of values inclusive of the derivative wave values.

9. The method of claim 7 wherein the array of values define a series of summary statistics, the method comprising the steps of:
   calculating mean, range, and standard deviation values for the summary values; and
   generating the array of values inclusive of the summary values.

10. The method of claim 7 comprising the step of collecting a value sampling from the array of values, the value sampling for enabling consistent subsequent file matching based on the file-identifying fingerprint.

11. The method of claim 10 wherein the value sampling is randomly collected for enhancing consistent subsequent file matching based on the file-identifying fingerprint.

12. The method of claim 11 wherein the randomly collected value sampling is derived from averaging three select values extracted from the array of values.

13. A computer-implemented method for associating a custom marker with a media file, the computer-implemented method comprising the steps of:
   extracting waveform data from a media file via data extraction means associated with computing means, the waveform data comprising a series of length segment values, the waveform data being extracted from the media file relative to a data extraction baseline, the length segment values comprising trough-to-baseline peak-to-baseline length segments;
   calculating statistical values for the series of length segment values via the computing means the statistical values being for the trough-to-baseline and peak-to-baseline length segments;
   generating a custom file marker based on the statistical values via the computing means; and
   associating the custom file marker with the media file via the computing means.

14. The method of claim 13 wherein the waveform data are time dependent, the method comprising the steps of:
   extracting time-based derivative wave values data from the waveform data via the computing means; and
   calculating statistical values for the time-based derivative wave values via the computing means.

15. The method of claim 13 wherein the waveform data define summary values, the method comprising the step of calculating statistical values for the summary values via the computing means.

16. The method of claim 13 comprising the step of collecting a value sampling from the statistical values via the computing means.

17. The method of claim 16 wherein the value sampling is randomly collected from a number of data points via the computing means.

18. The method of claim 17 wherein the randomly collected value sampling is derived from averaging three select values associated with the data points via the computing means.

19. A computer-implemented audio file matching method, the computer-implemented audio file matching method comprising the steps of:
   extracting waveform data from a test audio file via audio analysis means associated with computing means, the extracted waveform data comprising length segment values, the length segment values being extracted relative to a data extraction baseline, the length segment values comprising trough-to-baseline and peak-to-baseline length segment values;
   deriving summary statistics from the extracted waveform data via the computing means, the summary statistics being derived from the length segment values, the summary statistics comprising trough-to-baseline and peak-to-baseline length segment statistics;
   generating a custom marker based on the derived summary statistics via the computing means;
   inserting the custom marker into metadata of the test audio file thereby forming a marked audio file via the computing means;
   storing the marked audio file in a marked audio file database via the computing means; and
   comparing a secondary unmarked audio file to the marked audio file via the computing means, the custom marker being accessed when comparing the secondary unmarked audio file to the marked audio file for rendering a positive audio file match.

20. The method of claim 19 wherein the waveform data are time dependent, the method comprising the steps of:
   extracting time-based derivative wave values from the waveform data via the computing means; and
   calculating summary statistics for the time-based derivative wave values via the computing means.

21. The method of claim 19 comprising the step of collecting a value sampling from the summary statistics via the computing means.

22. The method of claim 21 wherein the value sampling is randomly collected from a number of data points via the computing means.

23. The method of claim 22 wherein the randomly collected value sampling is derived from averaging three select values associated with the data points via the computing means.

24. A computer-implemented media file matching method, the computer-implemented media file matching method comprising the steps of:
- extracting waveform data from a first media file via data extraction means associated with computing means, the extracted waveform data comprising length segment values, the length segment values being extracted relative to a data extraction baseline and comprising trough-to-baseline and peak-to-baseline length segment values;
- deriving summary statistics from the extracted waveform data via the computing means, the summary statistics being derived from the length segment values, the summary statistics comprising trough-to-baseline and peak-to-baseline length segment statistics;
- generating a custom marker based on the derived summary statistics via the computing means;
- associating the custom marker with the first media file thereby constructing a marked media file via the computing means; and
- accessing the custom marker when comparing a second media file to the marked media file for rendering a positive media file match via the computing means.

25. The method of claim 24 wherein the waveform data are time dependent, the method comprising the steps of:
- extracting time-based derivative wave values from the waveform data; and
- calculating summary statistics for the time-based derivative wave values.

26. The method of claim 24 comprising the step of collecting a value sampling from the summary statistics via the computing means.

27. The method of claim 26 wherein the value sampling is randomly collected from a number of data points via the computing means.

28. The method of claim 27 wherein the randomly collected value sampling is derived from averaging three select values associated with the data points via the computing means.

* * * * *